United States Patent
Fukazawa

(10) Patent No.: US 11,516,657 B2
(45) Date of Patent: Nov. 29, 2022

(54) RADIO DEVICE, CONTROL METHOD OF RADIO DEVICE, AND NON-TRANSITORY COMPUTER-READABLE RECORDING MEDIUM

(71) Applicant: JVCKENWOOD Corporation, Yokohama (JP)

(72) Inventor: Masaomi Fukazawa, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 142 days.

(21) Appl. No.: 16/798,494

(22) Filed: Feb. 24, 2020

(65) Prior Publication Data
US 2020/0304992 A1 Sep. 24, 2020

(30) Foreign Application Priority Data
Mar. 19, 2019 (JP) .............................. JP2019-050730

(51) Int. Cl.
*H04W 12/037* (2021.01)
*H04W 4/10* (2009.01)
(Continued)

(52) U.S. Cl.
CPC .......... *H04W 12/037* (2021.01); *H04W 4/10* (2013.01); *H04W 12/041* (2021.01); *H04W 12/75* (2021.01); *H04W 12/76* (2021.01)

(58) Field of Classification Search
CPC . H04W 12/037; H04W 12/041; H04W 12/75; H04W 12/76; H04W 4/10;
(Continued)

(56) References Cited

U.S. PATENT DOCUMENTS

2004/0028199 A1* 2/2004 Carlson .................. H04M 1/247
379/93.21
2004/0151310 A1* 8/2004 Fu ......................... H04L 9/0891
380/44

(Continued)

FOREIGN PATENT DOCUMENTS

| JP | 2001-203679 | 7/2001 |
| JP | 2002-016973 | 1/2002 |
| JP | 2004-254271 | 9/2004 |

OTHER PUBLICATIONS

Jung et al., "Session Key Generation for a Group Call and Device for Security Control", Nov. 2011, IEEE 10th International Conference on Trust, Security and Privacy in Computing and Communications, pp. 1756-1762 (Year: 2011).*

(Continued)

*Primary Examiner* — Kenneth W Chang
(74) *Attorney, Agent, or Firm* — Amin, Turocy & Watson, LLP

(57) ABSTRACT

A radio device includes a storage unit, a group call control unit, and a cipher key generation unit. The storage unit is configured to store therein a plurality of primary cipher keys, a plurality of pieces of device information, and a plurality of pieces of group information. The group call control unit is configured to perform a group call with radio devices belonging to a first group using a primary cipher key. The cipher key generation unit is configured to generate a secondary cipher key that is different from the primary cipher key when one or more radio devices belonging to the first group are selected during the group call. The group call control unit performs a temporary group call with the selected radio devices by switching the primary cipher key to the secondary cipher key.

6 Claims, 8 Drawing Sheets

(51) Int. Cl.
*H04W 12/041* (2021.01)
*H04W 12/75* (2021.01)
*H04W 12/76* (2021.01)

(58) Field of Classification Search
CPC .... H04W 12/03; H04W 4/08; H04L 65/1059; H04L 65/4061
See application file for complete search history.

(56) References Cited

U.S. PATENT DOCUMENTS

| | | | |
|---|---|---|---|
| 2005/0073964 A1* | 4/2005 | Schmidt | H04L 65/1101 370/352 |
| 2005/0128283 A1* | 6/2005 | Bulriss | H04N 7/147 348/14.1 |
| 2006/0159099 A1* | 7/2006 | Hensley | H04N 7/142 348/E7.079 |
| 2006/0165018 A1* | 7/2006 | Gierach | H04M 3/568 370/261 |
| 2006/0172727 A1* | 8/2006 | Lee | H04M 3/564 455/416 |
| 2007/0206738 A1* | 9/2007 | Patel | H04M 3/53333 379/93.24 |
| 2007/0274525 A1* | 11/2007 | Takata | H04L 63/065 380/270 |
| 2009/0147958 A1* | 6/2009 | Calcaterra | H04L 9/0833 380/260 |
| 2010/0220845 A1* | 9/2010 | Oliver | H04W 12/041 379/202.01 |
| 2011/0051912 A1* | 3/2011 | Sundaram | H04L 9/0825 379/202.01 |
| 2012/0155644 A1* | 6/2012 | Wealleans | H04W 12/033 380/270 |
| 2014/0237559 A1* | 8/2014 | Zhang | H04L 63/062 726/4 |

OTHER PUBLICATIONS

Aparna et al., "New Group Key Computation Technique for Secure Group Communication", Sep. 2008, IEEE 19th International Symposium on Personal, Indoorand Mobile Radio Communications, pp. 1-5 (Year: 2008).*
Japanese Office Action for Japanese Patent Application No. 2019-050730 dated Apr. 12, 2022.
Takagi et al., "A Team Oriented Encryption Method", Information Processing Society of Japan Report of Research, Japan, Information Processing Society of Japan, Sep. 20, 1990, 90th vol. No. 73, pp. 1-6.

* cited by examiner

FIG.4

RADIO DEVICE 10X

PRIMARY CIPHER KEY LIST　　31

| KEY NO. | KEY ID | KEY DATA |
|---|---|---|
| 1 | 1 | 0101⋯ |
| 2 | 2 | 0202⋯ |
| 3 | 3 | 0303⋯ |
|  | ⋮ | ⋮ |

UNIT ID LIST　　41

| LIST NO. | KEY ID | UNIT ID |
|---|---|---|
| 1 | 1000 | 1000 |
| 2 | 1010 | 1001 |
| 3 | 1020 | 1002 |
|  | ⋮ | ⋮ |

GROUP ID LIST　　51

| LIST NO. | KEY ID | GROUP ID |
|---|---|---|
| 1 | 2000 | 5000 |
| 2 | 2010 | 6000 |
| 3 | 2020 | 7000 |
|  | ⋮ | ⋮ |

FIG.5A

RADIO DEVICE 10A
UNIT ID (INDIVIDUAL ID OF RADIO DEVICE) : 1000

PRIMARY CIPHER KEY LIST (31)

| KEY NO. | KEY ID | KEY DATA |
|---|---|---|
| 1 | 1 | 0101··· |
| 2 | 2 | 0202··· |
| 3 | 3 | 0303··· |

UNIT ID LIST (42)

| LIST NO. | KEY ID | UNIT ID |
|---|---|---|
| 1 | 1000 | 1000 |
|  |  |  |
|  |  |  |

GROUP ID LIST (52)

| LIST NO. | KEY ID | GROUP ID |
|---|---|---|
| 1 | 2000 | 5000 |
| 2 | 2010 | 6000 |
| 3 |  |  |

FIG.5B

RADIO DEVICE 10B
UNIT ID (INDIVIDUAL ID OF RADIO DEVICE) : 1001

PRIMARY CIPHER KEY LIST (31)

| KEY NO. | KEY ID | KEY DATA |
|---|---|---|
| 1 | 1 | 0101··· |
| 2 | 2 | 0202··· |
| 3 | 3 | 0303··· |

UNIT ID LIST (42)

| LIST NO. | KEY ID | UNIT ID |
|---|---|---|
| 1 | 1010 | 1001 |
|  |  |  |
|  |  |  |

GROUP ID LIST (52)

| LIST NO. | KEY ID | GROUP ID |
|---|---|---|
| 1 | 2000 | 5000 |
| 2 | 2010 | 6000 |
| 3 |  |  |

FIG.5C

RADIO DEVICE 10C
UNIT ID (INDIVIDUAL ID OF RADIO DEVICE) : 1002

PRIMARY CIPHER KEY LIST (31)

| KEY NO. | KEY ID | KEY DATA |
|---|---|---|
| 1 | 1 | 0101··· |
| 2 | 2 | 0202··· |
| 3 | 3 | 0303··· |

UNIT ID LIST (42)

| LIST NO. | KEY ID | UNIT ID |
|---|---|---|
| 1 | 1020 | 1002 |
|  |  |  |
|  |  |  |

GROUP ID LIST (52)

| LIST NO. | KEY ID | GROUP ID |
|---|---|---|
| 1 | 2000 | 5000 |
| 2 | 2020 | 7000 |
| 3 |  |  |

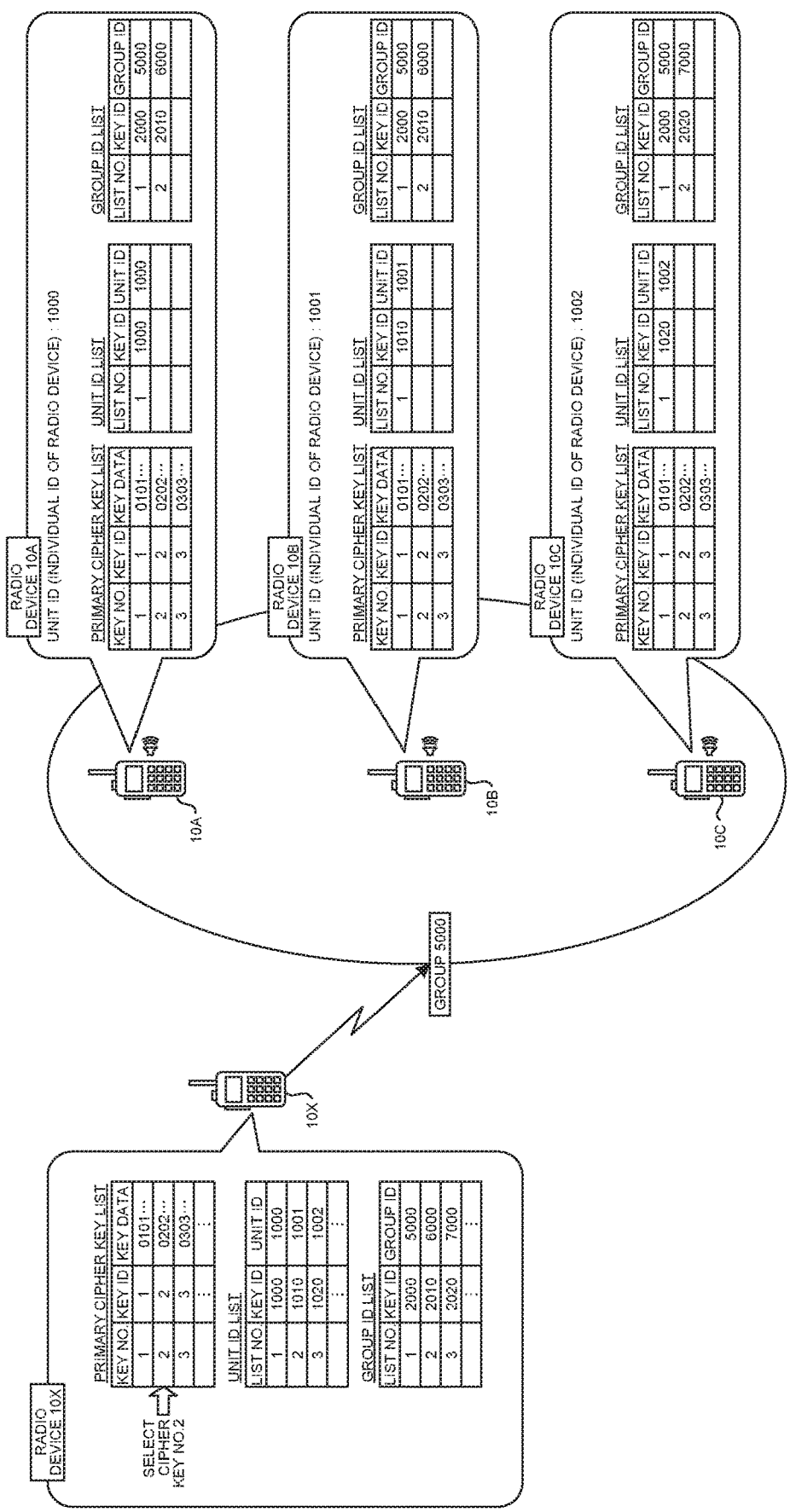

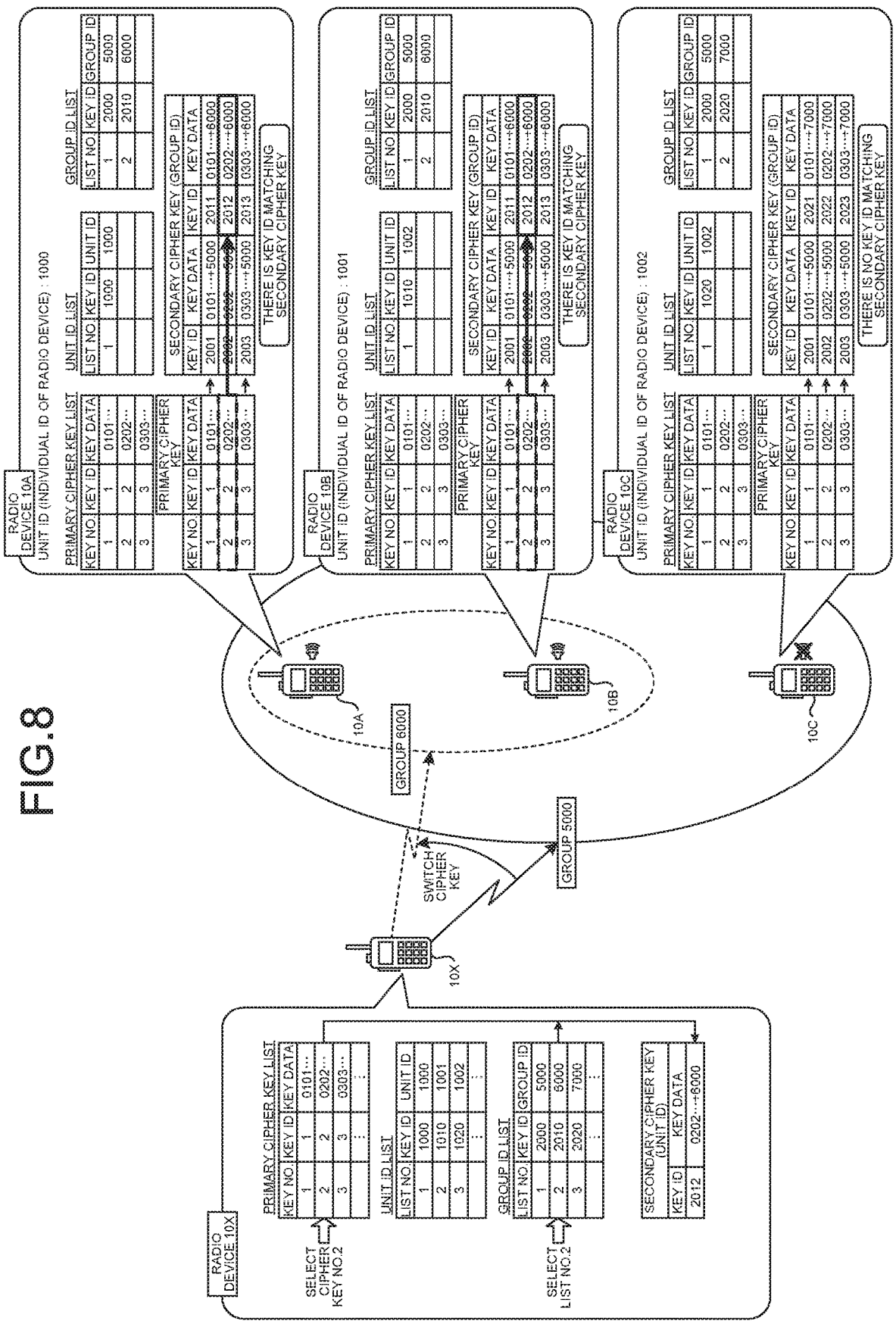

RADIO DEVICE, CONTROL METHOD OF RADIO DEVICE, AND NON-TRANSITORY COMPUTER-READABLE RECORDING MEDIUM

CROSS-REFERENCE TO RELATED APPLICATIONS

This application claims priority from Japanese Application No. 2019-050730, filed on Mar. 19, 2019, the contents of which are incorporated by reference herein in its entirety.

BACKGROUND

The present invention relates to a radio device that performs a group call with radio devices belonging to a predetermined group, a control method of a radio device, and a non-transitory computer-readable recording medium.

Generally, a radio device that performs a group call with radio devices belonging to a predetermined group has been known. JP-A-2002-16973 proposes a technique of switching to another group call in a one-touch operation, during a group call with a given group.

However, in a conventional configuration, switching of group calls is performed with a switching device, and switching of group calls cannot be performed only with a radio device.

In order to perform switching of group calls with a radio device, it is necessary to temporarily stop the current group call, and make an individual call to each of desired radio devices or make a group call to a group to which those desired radio devices belong. Thus, there is a problem in that procedures of switching group calls are complicated, and increased time and effort are required. Furthermore, in returning to a group call with an original group, there is a need to make a call for performing a group call with that group again.

SUMMARY

A radio device includes a storage unit, a group call control unit, and a cipher key generation unit. The storage unit is configured to store therein a plurality of primary cipher keys, a plurality of pieces of device information, and a plurality of pieces of group information. The group call control unit is configured to perform a group call with radio devices belonging to a first group using a primary cipher key. The cipher key generation unit is configured to generate a secondary cipher key that is different from the primary cipher key when one or more radio devices belonging to the first group are selected during the group call. The group call control unit performs a temporary group call with the selected radio devices by switching the primary cipher key to the secondary cipher key.

BRIEF DESCRIPTION OF THE DRAWINGS

FIG. 4 is a figure illustrating a primary cipher key list, and a unit ID list and a group ID list to be used by a caller radio device;

FIG. 5A is a figure illustrating a primary cipher key list, and a unit ID list and a group ID list to be used by a participant radio device;

FIG. 5B is a figure illustrating a primary cipher key list, and a unit ID list and a group ID list to be used by a participant radio device;

FIG. 5C is a figure illustrating a primary cipher key list, and a unit ID list and a group ID list to be used by a participant radio device;

FIG. 6 is a figure illustrating an ordinary group call using a primary cipher key;

FIG. 8 is a figure illustrating a state of a temporary group call with a radio device belonging to a specific group during the group call in FIG. 6.

DETAILED DESCRIPTION

Embodiments according to the present invention will now be described in detail based on the attached drawings. The present invention is not limited to the embodiments. In addition, constituent elements in the following embodiments include those that are replaceable and easily performable by those skilled in the art or those that are substantially the same.

Figure 1:
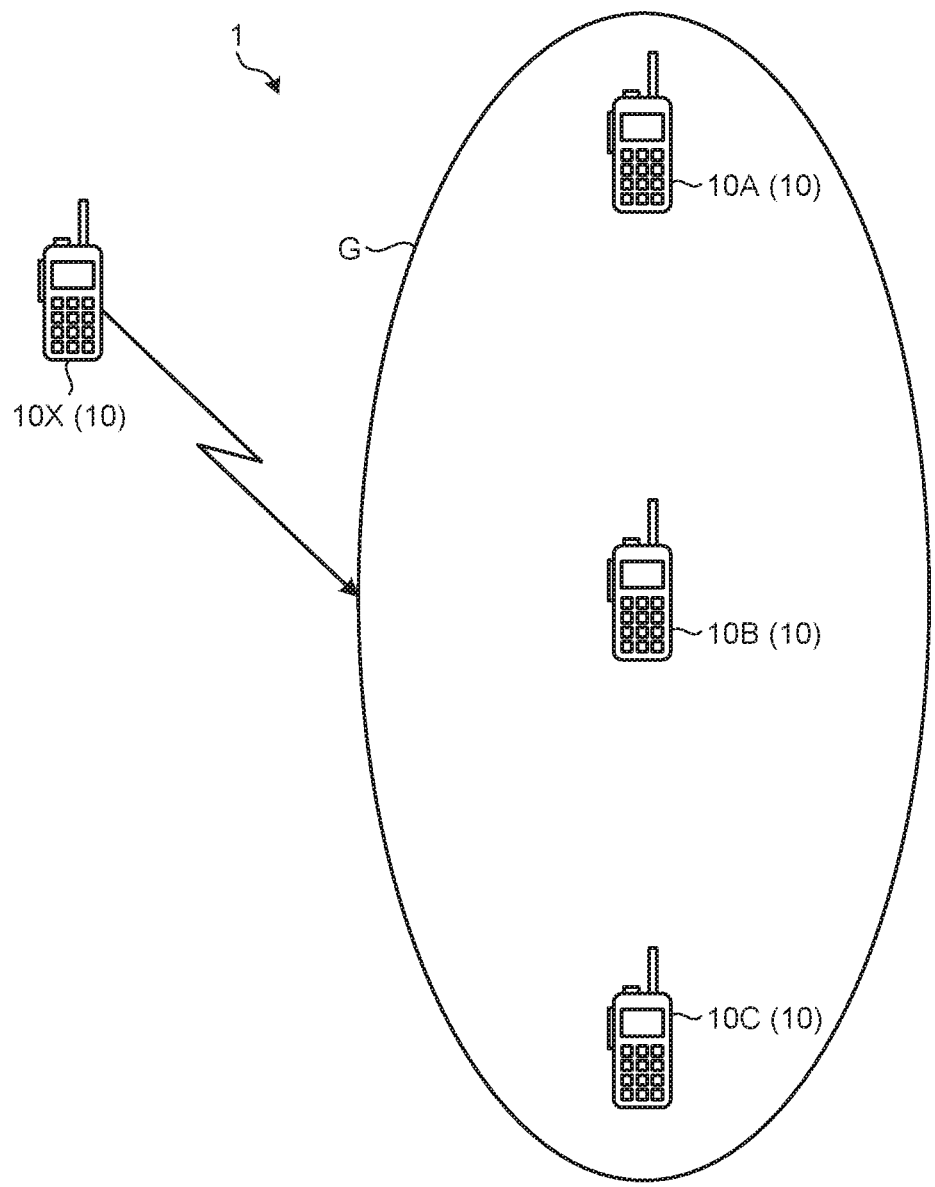
FIG. 1 is a schematic diagram of a radio communication system that includes a radio device according to the present embodiment.
Figure 2:
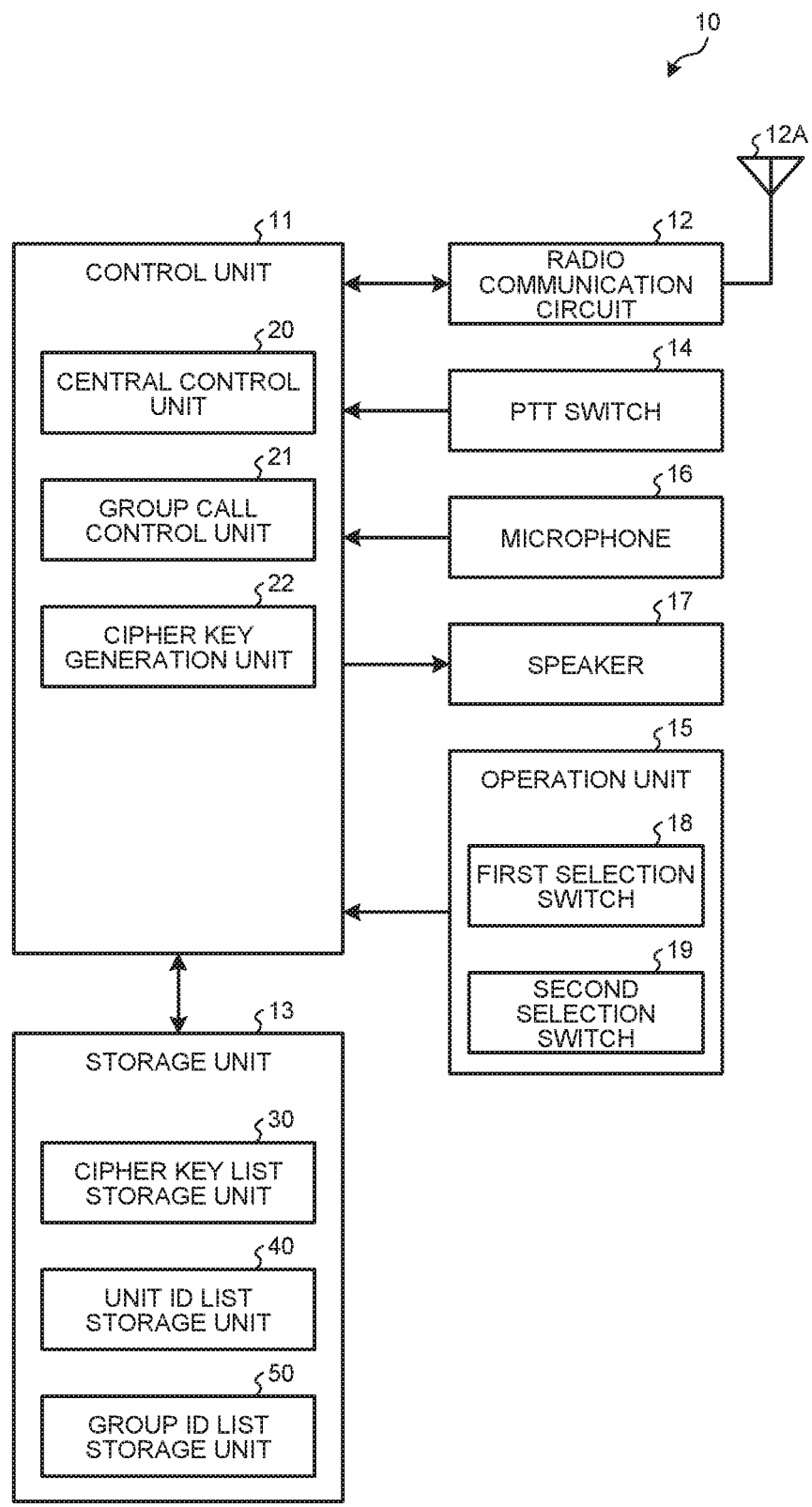
FIG. 2 is a functional block diagram of the radio device.
Figure 3:
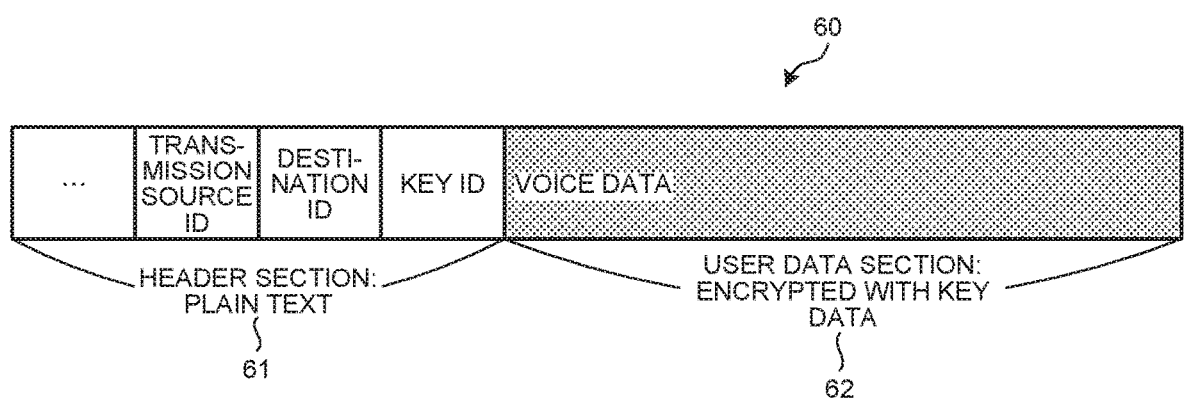
FIG. 3 is a figure illustrating a configuration example of a voice packet.

FIG. 1 is a schematic diagram of a radio communication system that includes a radio device according to the present embodiment, and FIG. 2 is a functional block diagram of the radio device. FIG. 3 is a figure illustrating a configuration example of a voice packet. FIG. 4 is a figure illustrating a primary cipher key list, and a unit ID list and a group ID list to be used by a caller radio device. FIG. 5A, FIG. 5B, and FIG. 5C each illustrate a primary cipher key list, and a unit ID list and a group ID list to be used by a participant radio device. The unit ID list is a list to be used in calling an individual radio device, and the group ID list is a list to be used in calling a specific group. The group ID list indicates a group to which the own radio device belongs. Furthermore, Key No. and List No. described in the tables in the drawings are sequential numbers for managing the rows of the lists. Key ID is a predetermined number for determining a value to be set for a header section of a voice packet, which will be described later. Key Data is key data to be used at the time of encryption or decryption, and for example, advanced encryption standard (AES) is employed. Since AES is a publicly known technique, detailed explanations thereof will be omitted. In the present embodiment, descriptions will be made by using Key Data of key length 256 bits (32 bytes). Furthermore, Unit ID is an identification number for identifying each radio device, and Group ID is an identification number for managing a plurality of radio devices altogether.

As illustrated in FIG. 1, a radio communication system 1 includes a plurality of (four in FIG. 1) radio devices 10 and enables a given group call of a group to which these radio devices 10 belong. In the example of FIG. 1, three radio devices 10A, 10B, and 10C belong to a predetermined group G, and one radio device 10X makes a call for performing a group call with the radio devices 10A, 10B, and 10C. The radio device 10X is a caller radio device (also referred to as the first radio device) and functions as a command station that makes a call for a group call. In addition, the radio devices 10A, 10B, and 10C are participant radio devices (also referred to as the second radio devices) and participate in the group call in response to the call for the group call made by the radio device 10X.

Radio devices 10 are mobile radio devices and each perform, for example, half-duplex radio communication between other radio devices 10. This half-duplex radio communication is a mode of radio communication in which transmission and reception of data cannot be performed at the same time, and only either transmission or reception can be performed at a separate time. The radio communication system 1 may include not only the radio devices 10 but also a base station and a relay station, and a group call may be performed through the base station and the relay station. Although the radio device 10X makes a call for a group call in the example of FIG. 1, the radio devices 10 all have the same configuration as one another, and the other radio devices 10A, 10B, and 10C are each able to make a call for a group call. In addition, although the radio communication system 1 includes four radio devices 10 in the example of FIG. 1, but the embodiment is not limited thereto, the number of radio devices 10 to be included in the radio communication system 1 is optional.

As illustrated in FIG. 2, the radio devices 10 each include a control unit 11, a radio communication circuit 12, a storage unit 13, a PTT switch 14, an operation unit 15, a microphone 16, and a speaker 17. During a group call, the radio devices 10 in the present embodiment each wait for reception of a voice from other radio devices 10 when the PTT switch 14 has not been pressed, and transmit an input voice to other radio devices 10 once the PTT switch 14 is pressed.

The control unit 11 can be implemented with a microprocessor or microcomputer. As functional internal configurations, the control unit 11 includes a central control unit 20, a group call control unit 21, and a cipher key generation unit 22. The central control unit 20, the group call control unit 21, and the cipher key generation unit 22 may be implemented with software (control program), or may be implemented with hardware. Furthermore, they may be implemented by combining software and hardware. When the central control unit 20, the group call control unit 21, and the cipher key generation unit 22 are implemented with a computer program, this computer program is stored on a computer readable storage medium such as a CD-ROM, flexible disk (FD), CD-R, or DVD in an installable-form or executable-form file, and is provided as a computer program product. The computer program may be stored on a computer that is connected to a network such as the Internet, and provided by being downloaded via the network. In addition, the computer program may be provided or distributed via a network such as the Internet. Furthermore, the computer program may be provided by being incorporated in an ROM or the like in advance.

The central control unit 20 controls the overall operation of the radio devices 10. The group call control unit 21 controls operations from calling to end of a group call. For example, once a group call is instructed by a user, the group call control unit 21 of a caller (the radio device 10X) of the group call makes a call for a group call to radio devices belonging to the instructed group. In addition, the group call control unit 21 of participants (the radio devices 10A, 10B, and 10C) of the group call participate in the group call by connecting communication in response to the call for the group call under the instruction of the user. At the time of the group call, the group call control unit 21 uses a given cipher key (for example, Key Data of a primary cipher key) to encrypt voice data for transmission, and decrypt received voice data.

As illustrated in FIG. 3, the encrypted voice data is transmitted as a voice packet 60 by being divided at prescribed data size and packetized. The voice packet 60 includes a header section 61, which is added at the beginning of the voice packet 60, and a user data section 62, which is continuous to the header section 61. Voice data that is encrypted by using the Key Data of the primary cipher key is stored in the user data section 62. The transmitter radio devices 10 each transmit information on a destination ID, which is the destination of the voice packet 60, a transmission source ID, and a Key ID by storing them in the header section 61 in a plain text without encryption. The Key ID stored in the header section 61 is the Key ID of the primary cipher key. Each of the receiver radio devices 10 reads out the destination ID and the Key ID stored in the header section 61, and specify, for example, whether the communication is directed to the group to which the radio device 10 belongs, and the Key Data of the primary cipher key used for the encryption, thereby enabling decryption of the voice data. In order to enable proper encryption communication between the transmitter radio device 10 and the receiver radio devices 10, the Key ID and the Key Data of the primary cipher key to be used for the encryption need to be set to a same value as each other in advance.

The group call control unit 21 monitors the primary cipher key used for the group call. In particular, the group call control unit 21 of the participants (the radio devices 10A to 10C) of the group call detects a change of the primary cipher key into, for example, a secondary cipher key, during the group call by detecting a change of the Key ID of the primary cipher key stored in the header section 61 of the voice packet 60. Thus, once the group call control unit 21 detects the change of the primary cipher key into the secondary cipher key, the group call control unit 21 determines whether the own radio device has the secondary cipher key after the change. Once the group call is instructed to end, the group call control unit 21 disconnects the communication and ends the group call.

The cipher key generation unit 22 generates the secondary cipher key, which is different from the primary cipher key, based on the instruction of the central control unit 20. The generation of the secondary cipher key will be described later.

The radio communication circuit 12 processes transmission and reception of voice data by radio communication between other radio devices 10, and an antenna 12A for transmitting and receiving the voice data is connected thereto. The PTT switch 14 is, for example, a push button for causing the radio device 10 to become a transmission state to communicate with other radio devices 10. Reception of voices from other radio devices 10 is waited when the PTT switch 14 has not been pressed, and input voices are transmitted to other radio devices 10 when the PTT switch 14 is pressed. The microphone 16 converts an input voice into an electrical signal. The speaker 17 converts the received electrical signal into a voice and outputs the voice.

The operation unit 15 is various kinds of keys and buttons that are provided on a housing of the radio device 10. Although not illustrated, this operation unit 15 includes a power key for powering on/off, a channel selecting key for selecting a channel (frequency) at the time of communication with other radio devices 10, up/down/right/left cursor keys, and the like. The operation unit 15 includes a first selection switch 18 and a second selection switch 19. The first selection switch 18 has a function to, during a group call, select one or more radio devices (for example, the radio device 10A) in the group. The second selection switch 19 has a function to, during a group call, select another group (for example, a group including only the radio devices 10A, 10B) included in the group. With regard to the first selection switch 18 and the second selection switch 19, a function to select a specific radio device or group may be assigned to an optional key that is provided on the housing.

The storage unit 13 stores therein various kinds of data and control programs. The storage unit 13 includes a cipher key list storage unit (cipher key storage unit) 30, a unit ID list storage unit 40, and a group ID list storage unit 50. For example, a semiconductor memory element such as flash memory may be used as the storage unit 13. The storage unit 13 may be a storage device such as a hard disk drive (HDD). The cipher key list storage unit 30, the unit ID list storage unit 40, and the group ID list storage unit 50 included in the storage unit 13 may be separately provided, or may be integrally formed by dividing their areas.

The cipher key list storage unit 30 stores therein a primary cipher key list 31 in which one or a plurality of primary cipher keys used at the time of a group call are listed. The primary cipher key list 31 lists primary cipher keys used by the radio device 10X, which is a caller of a group call, and the radio devices 10A to 10C, which are participants of the group call, at the time of the group call. As illustrated in FIG. 4 and FIG. 5A to FIG. 5C, Key NOs. to which Key IDs and Key Data are each linked are registered in the primary cipher key list 31. The Key ID and the Key Data corresponding to a Key NO. that is selected from the primary cipher key list 31 are used at the time of the group call as the primary cipher key. The Key Data is, for example, a data column of 32 bytes. In this embodiment, data of one byte is expressed in double digits in hexadecimal, and Key Data in FIG. 4 and FIG. 5A to FIG. 5C is described in alphanumeric characters of 64 digits. However, for convenience of explanation, only four digits at the beginning are shown, and the digits thereafter are omitted and described as " . . . ".

The unit ID list storage unit 40 stores therein unit ID lists 41, 42. The unit ID list 41 is a list of device information to be used by the radio device 10X, which is the caller of the group call. List NOs. of radio devices (the radio devices 10A to 10C), to which the radio device 10X can make an individual call, are linked with Key IDs and Unit IDs, and are registered in the unit ID list 41. The Unit ID indicates an individual ID of each of the radio devices 10A to 10C. The Key ID is a unique value that is used in generating a secondary cipher key to be used for a temporary group call with one radio device that is selected during a group call.

On the other hand, as illustrated in FIG. 5A to FIG. 5C, the unit ID list 42 is a list of device information to be used by participant radio devices (the own radio device; the radio devices 10A to 10C) of the group call. FIG. 5A illustrates the unit ID list of the radio device 10A; FIG. 5B illustrates the unit ID list of the radio device 10B; and FIG. 5C illustrates the unit ID list of the radio device 10C. List NOs. relating to the radio devices 10A to 10C (the own radio device), to which the radio device 10X can make an individual call, are linked with Key IDs and Unit IDs, and are registered in the unit ID list 42. The Unit ID indicates an individual ID of the radio device (the own radio device).

The Key ID and the Unit ID of the radio device (the own radio device) that are set in the unit ID list 42 are used in generating a secondary cipher key. The combination of the Key ID and the Unit ID needs to be set to the same combination as the Key ID and the Unit ID of the radio device (the own radio device) that are set in the unit ID list 41 for individual calling of the radio device 10X. In the examples described in FIG. 5A to FIG. 5C, only the Unit ID of the own radio device is set in the unit ID list 42. However, the radio devices 10A to 10C can also perform individual calling. In this case, the Key ID and the Unit ID of the radio device that desires to perform the individual calling are set in the unit ID list 42.

The group ID list storage unit 50 stores therein group ID lists 51, 52 to be used at the time of making a group call. The group ID lists 51, 52 also indicate the Group ID of another group to which the own radio device belongs at the same time. The group ID list 51 is a list of group information to be used by the radio device 10X, which is the caller of the group call. List NOs. of the respective groups, to which the radio device 10X can make a group call, are linked with Key IDs and Group IDs, and are registered in the group ID list 51. These groups are determined in advance. The Group ID indicates an individual ID of a group to which the radio devices 10A to 10C belong. The Key ID is a unique value that is used in generating a secondary cipher key to be used for a temporary group call with one group that is selected during the group call. In this case, one or more radio devices belonging to the one selected group consist of one or more radio devices belonging to the group being in the group call.

As illustrated in FIG. 5A to FIG. 5C, the group ID list 52 is a list of group information on participant radio devices (the own radio device; the radio devices 10A to 10C) of the group call. In this example, as illustrated in FIG. 5A, the radio device 10A belongs to groups in which the Group IDs are "5000" and "6000". In addition, as illustrated in FIG. 5B, the radio device 10B belongs to the groups in which the Group IDs are "5000" and "6000" as in the case of the radio device 10A. Furthermore, as illustrated in FIG. 5C, the radio device 10C belongs to groups in which the Group IDs are "5000" and "7000". List NOs. related to the respective groups, to which the radio device 10X can make a group call, are linked with Key IDs and Group IDs, and are registered in the group ID list 52. In addition, the Group ID indicates an individual ID of a group to which the own radio device belongs. This group ID list 52 is also used in generating a secondary cipher key, and the combinations of the Key IDs and the Group IDs need to be set to the same combinations as the Key IDs and the Group IDs that are set in the group ID list 51 of the radio device 10X.

The secondary cipher key will now be described. This secondary cipher key is a cipher key for, during a group call using the primary cipher key, temporarily performing a call with a specific radio device in the group call. A temporary group call with the specific radio device is enabled by transmission of a voice from the radio device 10X only to the specific radio device in the group call using the secondary cipher key. The cipher key generation unit 22 generates the secondary cipher key based on the primary cipher key and device information on the selected radio device, or the primary cipher key and group information on another group to which only the selected radio device belongs.

Specifically, the secondary cipher key includes a Key ID, and this Key ID of the secondary cipher key is generated by adding (calculating) a Key ID of the primary cipher key and a Key ID of the unit ID lists 41, 42 or a Key ID of the group ID lists 51, 52. For example, if the Key ID of the primary cipher key is "2", and the Key ID of the unit ID list 41 is "1000", the Key ID of the secondary cipher key would be "1002". In addition, for example, if the Key ID of the primary cipher key is "2", and the Key ID of the group ID list 51 is "2010", the Key ID of the secondary cipher key would be "2012".

The Key ID of the primary cipher key, the Key ID of each of the unit ID lists 41, 42, and the Key ID of each of the group ID lists 51, 52 are each set based on the following rules.

(1) When the Key ID of the primary cipher key is added to the Key ID of the unit ID lists 41, 42 or the Key ID of the group ID lists 51, 52, the sum should not exceed a predetermined value (for example, 4095).

(2) When all the Key IDs of the primary cipher key are added to the Key ID of the unit ID lists 41, 42 or the Key ID of the group ID lists 51, 52, the sum should not overlap (should not be the same) with the values of other Key IDs of the unit ID lists 41, 42 or other Key IDs of the group ID lists 51, 52. By following these rules (1) and (2), the Key ID of the secondary cipher key can be uniquely determined.

The secondary cipher key includes Key Data. The Key Data is generated by adding (calculating) Key Data of the primary cipher key and a Unit ID of the unit ID lists 41, 42. For example, if four digits at the beginning of the Key Data of the primary cipher key are "0202", and the following 60 digits are all "0", when the Unit ID of the unit ID list 41 is "1000", the Key Data of the secondary cipher key would be "0202 . . . 0000"+"1000"="0202 . . . 1000" (in this embodiment, the part shown as " . . . "is all "0"; the same applies hereinafter). Similarly, the Key Data is generated by adding (calculating) Key Data of the primary cipher key and a Group ID of the group ID lists 51, 52. For example, if the Key Data of the primary cipher key is "0202 . . . ", and the Group ID of the group ID list 51 is "6000", the Key Data of the secondary cipher key would be "0202 . . . "+ "6000"="0202 . . . 6000".

In this manner, in the present embodiment, the cipher key generation unit 22 generates the secondary cipher key by adding the Key ID and the Group ID of the group ID list only of the selected radio device(s) belongs, or the Key ID and the Unit ID of the unit ID list of the selected radio device(s), and the Key ID and the Key Data of the primary cipher key. Thus, even if the secondary cipher keys are not stored beforehand, a proper cipher key can be generated and used.

Figure 7:
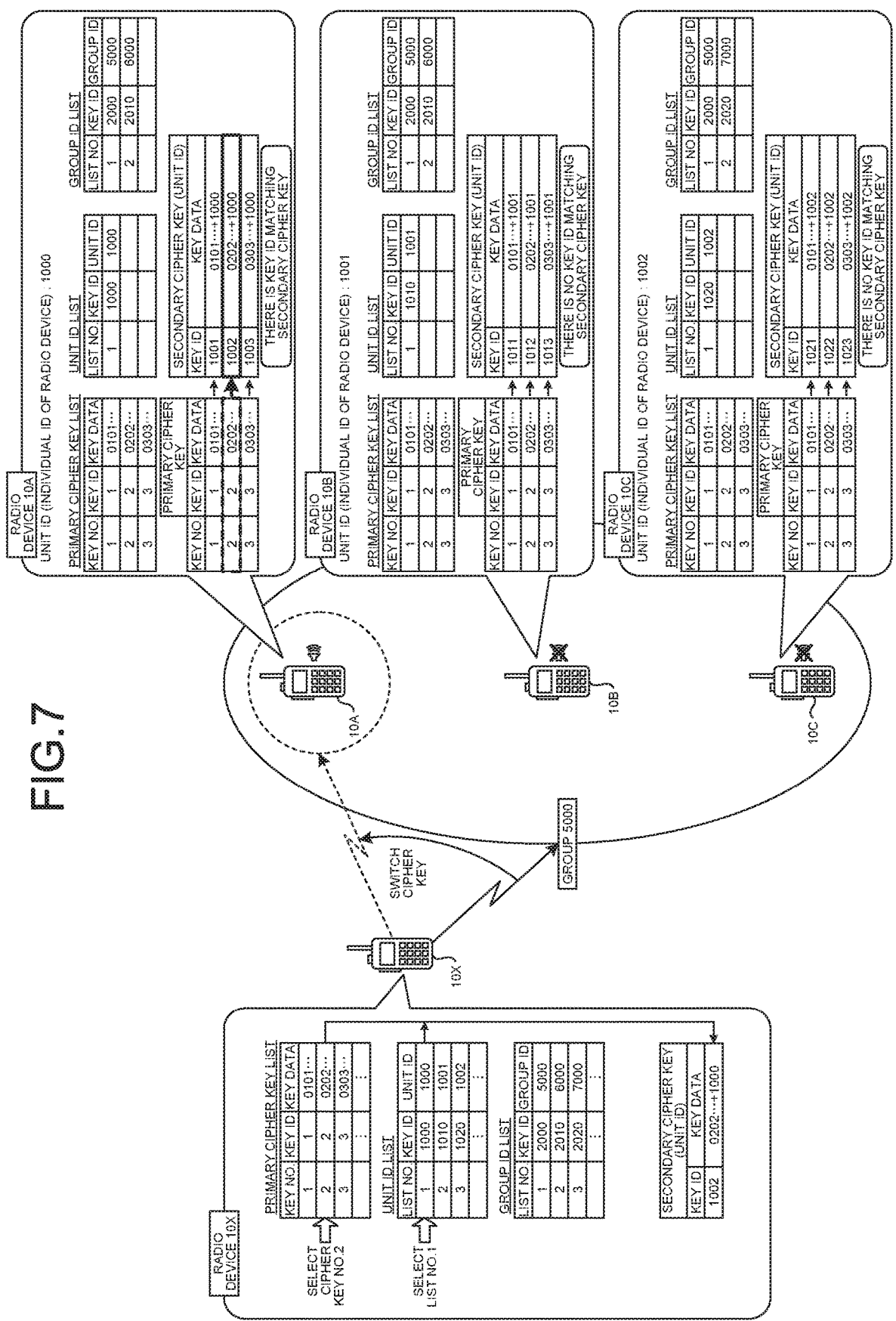
FIG. 7 is a figure illustrating a state of a temporary group call with a specific radio device during the group call in FIG. 6.

Operations of the radio communication system 1 will now be described. FIG. 6 is a figure illustrating an ordinary group call using a primary cipher key. FIG. 7 is a figure illustrating a state of a temporary group call with a specific radio device during the group call in FIG. 6. In the example of FIG. 7, the radio device 10X performs a temporary group call with the radio device 10A serving as the specific radio device during the group call.

The radio device 10X makes a group call to the radio devices 10A to 10C. As illustrated in FIG. 6, the radio device 10X selects Key NO. "2" from the primary cipher key list, and selects Group ID "5000" from the group ID list, based on the user instruction. The group call control unit 21 of the radio device 10X encrypts voice data with Key Data "0202 . . . " set for Key NO. "2", then sets Key ID "2" to the header section 61, and transmits the voice data (the voice packet 60) of the group call to the radio devices belonging to the group having Group ID "5000".

Since the radio devices 10A to 10C all belong to the group having Group ID "5000", the group call control unit 21 of each of the radio devices 10A to 10C performs a reception operation (a group call step). In this embodiment, the voice data of the group call received by the radio devices 10A to 10C has been encrypted. Thus, the group call control unit 21 reads the Key ID set for the header section 61 of the received voice data (the voice packet 60), and checks whether the same Key ID exists in the primary cipher key list 31 of the own radio device. If the same Key ID exists, the encrypted voice data will be decrypted using the Key Data linked to the Key ID. The radio devices 10A to 10C all have the primary cipher key having Key ID "2" and Key Data "0202 . . . ".

Thus, the radio devices 10A to 10C are able to output a proper received voice from the speaker 17.

Then, during the group call described above, the radio device 10X performs a temporary group call with the radio device 10A, which serves as the specific radio device, without disconnecting (stopping) the group call. The radio device 10X includes the first selection switch 18 in the operation unit 15. This first selection switch 18 is provided with a function to select the specific radio device 10A, which is one of the radio devices belonging to the group, during the group call. Specifically, the first selection switch 18 is assigned with List No. of the unit ID list in which the unit ID of the radio device 10A is set. Thus, once the first selection switch 18 is operated (pressed down) and the radio device 10A is selected by user operations, the cipher key generation unit 22 of the radio device 10X generates a secondary cipher key based on the primary cipher key and device information on the selected radio device 10A (a secondary cipher key generation step).

Specifically, the cipher key generation unit 22 generates Key ID "1002" of the secondary cipher key by adding Key ID "2" of the primary cipher key and Key ID "1000" of the List No. (corresponding to the radio device 10A) in the unit ID list assigned to the first selection switch 18. Further, the cipher key generation unit 22 generates Key Data "0202 . . . +1000" of the secondary cipher key by adding Key Data "0202 . . . " of the primary cipher key and Unit ID "1000" of the List No. (corresponding to the radio device 10A) in the unit ID list assigned to the first selection switch 18. By using these generated Key ID "1002" and Key Data "0202 . . . +1000" as the secondary cipher key, the group call control unit 21 of the radio device 10X encrypts voice data with the Key Data of the secondary cipher key, and sets the Key ID of the secondary cipher key for the header section 61, thereby transmitting the encrypted voice data to each of the radio devices 10A to 10C.

The group call control unit 21 of the radio devices 10A to 10C monitors the Key ID of voice data that is received during the group call, and once a change of the received Key ID is detected, the group call control unit 21 determines that the primary cipher key is switched to the secondary cipher key, and determines whether the own radio device has the secondary cipher key after the switching. In the present embodiment, the group call control unit 21 of each of the radio devices 10A to 10C causes the cipher key generation unit 22 to generate a secondary cipher key based on predetermined rules, and determines whether the Key ID matching the generated secondary cipher key is included. In the example of FIG. 7, the cipher key generation unit 22 of the radio device 10A is able to generate the secondary cipher key having Key ID "1002" and Key Data "0202 . . . +1000". Thus, the group call control unit 21 of the radio device 10A is able to decrypt the voice data, and output a proper received voice from the speaker 17 by switching the primary cipher key to the generated secondary cipher key. In this manner, during the group call described above, the radio device 10X is able to perform a temporary group call with the radio device 10A without disconnecting the group call (a temporary group call step).

On the other hand, the cipher key generation unit 22 of each of the radio devices 10B, 10C is unable to generate the secondary cipher key described above having Key ID "1002" and Key Data "0202 . . . +1000". Thus, the radio devices 10B, 10C are unable to participate in the temporary group call. However, the users of the radio devices 10B, 10C may become anxious when they are suddenly disconnected during the group call. Therefore, the group call control unit 21 of each of the radio devices 10B, 10C outputs a specific voice (for example, beep sound; notification sound) from the speaker 17 of the radio device. In this manner, the users of the radio devices 10B, 10C can recognize that the group call has been temporarily discontinued. Instead of the beep sound, for example, a message notifying that other radio devices are having a group call using the secondary cipher key may be output as a voice.

When the first selection switch 18 is operated (pressed down again), the temporary group call between the radio device 10X and the radio device 10A ends, and the group call control unit 21 of the radio device 10X performs switching from the secondary cipher key to the primary cipher key again. The radio devices 10A to 10C monitor the Key ID of the header section 61 of the received packet, and once a change of this Key ID to the Key ID of the primary cipher key is detected, resuming of the group call having Group ID "5000" can be detected. In this manner, voice data that is encrypted with the primary cipher key is transmitted to the radio devices 10A to 10C, and thus the group call with the radio devices 10A to 10C belonging to Group ID "5000" can be resumed.

Another embodiment will now be described. FIG. 8 is a figure illustrating a state of a temporary group call with a radio device belonging to a specific group during the group call in FIG. 6. In the example of FIG. 8, during the group call (the group call step) with the radio devices 10A to 10C belonging to Group ID "5000" as in the case described above, the radio device 10X performs a temporary group call with the radio devices 10A, 10B belonging to a specific group. This specific group is set to have Group ID "6000", and is a different group included in the group having Group ID "5000". Only the radio devices 10A, 10B belong to the specific group.

The radio device 10X performs the temporary group call with the radio devices 10A, 10B belonging to Group ID "6000" during the group call with the radio devices 10A to 10C belonging to Group ID "5000" without disconnecting (stopping) the group call. The radio device 10X includes the second selection switch 19 in the operation unit 15, and this second selection switch 19 has a function to select, during a group call, another group (Group ID "6000") included in the group. Specifically, the second selection switch 19 is assigned with List No. of the group ID list in which Group ID "6000" is set. Thus, once the second selection switch 19 is operated (pressed down) and Group ID "6000" is selected by user operations, the cipher key generation unit 22 of the radio device 10X generates the secondary cipher key based on the primary cipher key and group information on selected Group ID "6000" (the secondary cipher key generation step).

The cipher key generation unit 22 generates Key ID "2012" of the secondary cipher key by adding Key ID "2" of the primary cipher key and Key ID "2010" corresponding to Group ID "6000" of a List No. in the group ID list assigned to the second selection switch 19. Further, the cipher key generation unit 22 generates Key Data "0202 . . . +6000" of the secondary cipher key by adding Key Data "0202 . . . " of the primary cipher key and Group ID "6000" of the List No. in the group ID list assigned to the second selection switch 19. These generated Key ID "2012" and Key Data "0202 . . . +6000" are used as the secondary cipher key, and the group call control unit 21 of the radio device 10X encrypts voice data with the Key Data of the secondary cipher key, thereby setting the Key ID of the secondary cipher key for the header section 61 and transmitting the encrypted voice data to each of the radio devices 10A to 10C.

The group call control unit 21 of the radio devices 10A to 10C monitors the "Key ID" of the voice data that is received during the group call, and once a change of the received Key ID is detected, the group call control unit 21 determines that the primary cipher key is switched to the secondary cipher key, and determines whether the own radio device has the secondary cipher key after the switching. In the present embodiment, the group call control unit 21 of each of the radio devices 10A to 10C causes the cipher key generation unit 22 to generate the secondary cipher key based on predetermined rules, and determines whether the Key ID matching the generated secondary cipher key is included. In the example of FIG. 8, the cipher key generation unit 22 of the radio devices 10A, 10B is able to generate the secondary cipher key having Key ID "2012" and Key Data "0202 . . . +6000". Thus, the group call control unit 21 of each of the radio devices 10A, 10B is able to decrypt the voice data, and output a proper received voice from the speaker 17 by switching the primary cipher key to the generated secondary cipher key. In this manner, during the group call described above, the radio device 10X is able to perform a temporary group call only with the radio devices 10A, 10B belonging to the group having Group ID "6000" without disconnecting the group call (the temporary group call step).

On the other hand, the cipher key generation unit 22 of the radio device 10C is unable to generate the secondary cipher key described above having Key ID "2012" and Key Data "0202 . . . +6000". Thus, the radio device 10C is unable to participate in the temporary group call. However, the user of the radio device 10C may become anxious when he/she is suddenly disconnected during the group call. Therefore, the group call control unit 21 of the radio device 10C outputs a specific voice (for example, beep sound; notification sound) from the speaker 17 of the radio device. In this manner, the user of the radio device 10C can recognize that the group call has been temporarily discontinued. Instead of the beep sound, for example, a message notifying that other radio devices are having a group call using the secondary cipher key may be output as a voice.

When the second selection switch 19 is operated (pressed down again), the temporary group call between the radio device 10X and the radio devices 10A, 10B belonging to the group having Group ID "6000" ends, and the group call control unit 21 of the radio device 10X performs switching from the secondary cipher key to the primary cipher key again. The radio devices 10A to 10C monitor the Key ID of the header section 61 of the received packet, and once a change of this Key ID to the Key ID of the primary cipher key is detected, resuming of the group call having Group ID "5000" can be detected. In this manner, voice data that is encrypted with the primary cipher key is transmitted to the radio devices 10A to 10C. Thus, the group call with the radio devices 10A to 10C belonging to Group ID "5000" can be resumed.

As described above, the radio device 10 according to the present embodiment includes the cipher key list storage unit 30 that stores therein primary cipher keys, the group call control unit 21 that performs a group call with radio devices belonging to a predetermined group (first group) using a primary cipher key, and the cipher key generation unit 22 that generates a secondary cipher key different from the primary cipher key when one or more radio devices belonging to the first group are selected during the group call. Since the group call control unit 21 performs the temporary group call with the selected radio devices by switching the primary cipher key to the generated secondary cipher key, switching to the temporary group call can be easily performed without disconnecting the current group call.

Further, the cipher key generation unit 22 generates a Key ID and Key Data of the secondary cipher key based on the Key IDs and the Unit IDs of the radio devices belonging to the first group or the Key IDs and the Group IDs of another group (second group) including the radio devices belonging to the first group, and the Key ID and the Key Data of the primary cipher key. Thus, a proper cipher key can be generated and used even if secondary cipher keys are not retained in advance by storage or the like.

Further, when the temporary group call ends, the group call control unit 21 resumes the original group call by switching the secondary cipher key to the primary cipher key. Thus, time and effort to make a group call each time are unnecessary, and operations become simple.

Still further, when a temporary group call is performed during a group call, the group call control unit 21 outputs notification sound to radio devices that are participating in the group call but are not participating in the temporary group call. Thus, users of the radio devices not participating in the temporary group call can recognize that the group call has been temporarily discontinued.

Although the embodiments of the present invention have been described above, the present invention is not limited to the above-described embodiments. For example, although Key IDs and Group IDs as group information on another group (second group) to which only selected radio devices belong and Key IDs and Unit IDs as device information on the selected radio devices are utilized to generate the secondary cipher key, but the present invention is not limited thereto. Other values may also be utilized as long as those values have unique values that can uniquely determine specific groups or radio devices.

According to the embodiments, when one or more radio devices belonging to a group are selected during a group call, a temporary group call with the selected radio devices is performed by switching a primary cipher key to a generated secondary cipher key, and thus switching to the temporary group call can be easily performed without disconnecting the current group call.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A radio device, comprising:
a processor that executes computer-executable instructions stored in a computer memory that is coupled to the processor, which causes the processor to:
select a communication channel;
transmit voice data on the selected communication channel;
store in the computer memory a plurality of primary cipher keys, a plurality of pieces of device information, and a plurality of pieces of group information;
perform a group call on the selected communication channel with radio devices belonging to a first group by encrypting the voice data using a primary cipher key;
generate a secondary cipher key that is different from the primary cipher key when one or more radio devices belonging to the first group are selected during the group call; and
perform a temporary group call with the selected radio devices, on the selected communication channel and while the voice data is being continuously transmitted on the selected communication channel, by switching the primary cipher key to the secondary cipher key such that the voice data is now being encrypted by the secondary cipher key.

2. The radio device according to claim 1, wherein the processor generates the secondary cipher key based on the device information on the radio devices belonging to the first group selected by the processor or the group information on a second group including the radio devices belonging to the first group, and the primary cipher key.

3. The radio device according to claim 1, wherein when the temporary group call ends while the voice data is being continuously transmitted on the selected communication channel, the processor resumes the original group call by switching the secondary cipher key to the primary cipher key without disconnecting the group call.

4. The radio device according to claim 1, wherein when the temporary group call is performed during the group call, the processor outputs notification sound to radio devices that are participating in the group call but are not participating in the temporary group call.

5. A control method of a radio device, the control method comprising:
selecting a communication channel;
transmitting voice data on the selected communication channel;
performing a group call on the selected communication channel with radio devices belonging to a first group by encrypting the voice data using a primary cipher key;
generating a secondary cipher key that is different from the primary cipher key when one or more radio devices belonging to the first group are selected during the group call; and
performing a temporary group call with the selected radio devices, on the selected communication channel and while the voice data is being continuously transmitted on the selected communication channel, by switching the primary cipher key to the secondary cipher key such that the voice data is now being encrypted by the secondary cipher key.

6. A non-transitory computer-readable recording medium containing a computer program causing a computer to execute:
selecting a communication channel;
transmitting voice data on the selected communication channel;
performing a group call on the selected communication channel with radio devices belonging to a first group by encryptin the voice data using a primary cipher key;
generating a secondary cipher key that is different from the primary cipher key when one or more radio devices belonging to the first group are selected during the group call; and
performing a temporary group call with the selected radio devices, on the selected communication channel and while the voice data is being continuously transmitted on the selected communication channel, by switching the primary cipher key to the secondary cipher key such that the voice data is now being encrypted by the secondary cipher key.

* * * * *